United States Patent [19]
Wang

[11] Patent Number: 5,153,857
[45] Date of Patent: Oct. 6, 1992

[54] METHOD FOR SELECTING SEISMIC TRACES FOR HIGHER EFFICIENCY OF PRE-STACK TWO DIMENSIONAL OR THREE DIMENSIONAL DEPTH MIGRATION

[75] Inventor: Shein S. Wang, Ponca City, Okla.

[73] Assignee: Conoco Inc., Ponca City, Okla.

[21] Appl. No.: 727,751

[22] Filed: Jul. 9, 1991

[51] Int. Cl.⁵ .............................................. G01V 1/28
[52] U.S. Cl. ...................................... 367/50; 367/38; 367/59
[58] Field of Search ...................... 367/38, 50, 51, 59, 367/63, 60, 73; 364/421

[56] References Cited

U.S. PATENT DOCUMENTS

| | | | |
|---|---|---|---|
| 4,464,737 | 8/1984 | Pann | 367/63 |
| 4,467,460 | 8/1984 | Johnson | 367/56 |
| 4,479,183 | 10/1984 | Ergas | 364/421 |
| 4,561,074 | 12/1985 | Warmack | 367/46 |
| 4,661,934 | 4/1987 | Carruth, Jr. | 367/37 |
| 4,665,510 | 5/1987 | Foster et al. | 367/21 |
| 4,675,851 | 6/1987 | Savit et al. | 367/41 |
| 4,759,636 | 7/1988 | Ahern et al. | 367/52 |
| 4,779,238 | 10/1988 | Howard | 367/63 |
| 4,964,103 | 10/1990 | Johnson | 367/53 |

Primary Examiner—Ian J. Lobo

[57] ABSTRACT

A method for improving the efficiency of pre-stack depth migration includes the steps of deleting a portion of the received data to obtain a representative remaining portion. All the shots are separated into several series, such that within each series the receiver locations are repeating. One or more series of shots is selected for migrating. With each series, receivers are selected from each shot such that their locations are repeating. This allows maximum re-use of the travel time tables and resulting in the best efficiency of the depth migration. The same principal can be applied to three dimensional prestack depth migration to improve its efficiency.

8 Claims, 1 Drawing Sheet 4,153,857

METHOD FOR SELECTING SEISMIC TRACES FOR HIGHER EFFICIENCY OF PRE-STACK TWO DIMENSIONAL OR THREE DIMENSIONAL DEPTH MIGRATION

BACKGROUND OF THE INVENTION

1. Field of the Invention

The present invention pertains to seismic data processing and more particularly to efficient seismic data processing whereby portions of the total received seismic data are selected to provide an accurate representation of the entire set of seismic data.

2. Related Prior Art

Prior art has provided many ways to shorten processing time in the field of processing seismic data. These methods have occurred mainly in the form of data compression, where the total amount of seismic data is taken and selected bits of digital data is eliminated as inconsequential or contains nothing meaningful that cannot be surmised when the retained data is evaluated.

U.S. Pat. No. 4,467,460, "Seismic Data Acquisition Method", (Philip W. Johnson), relates to the field locations of seismic shot points, chosen to produce partial multi-fold data. The static correction equations of this partial multi-fold data are at least partially coupled. The seismic cross sections resulting from this procedure are improved.

U.S. Pat. No. 4,561,074, "Computationally Efficient Weighting and Vertical Stacking Methods and Apparatus for Improving the Signal-to-Noise Ratio of Seismic Data", (Ralph E. Warmack), relates to improved methods and apparatus for vertically stacking seismic trace data collected by a digital field recorder during seismic prospecting utilizing plural initiations of a low energy surface seismic source. Seismic trace data generated by consecutive seismic source initiations and acquired at a common detector location is weighted and summed together, and the sum is normalized prior to being recorded. The signal to noise ratio of the seismic trace data is improved. The methods and apparatus by which the weighting values are calculated and applied provides computational simplifications which reduce the program storage requirements and increase the computation speed of the microcomputer circuit.

U.S. Pat. No. 4,661,934, "Ground Position Controller and Method for Automatically Indicating Parameters that Spatially Cross-Reference the Locations of seismic Spread and Source Arrays During Exploration for Hydrocarbons and the Like", (H.T. Caruth, Jr.), relates to a ground position controller utilizing a microcomputer system interconnected to a digital field system (DFS) via a system bus, for generating, formatting and displaying information under a variety of shooting and collecting conditions.

U.S. Pat. No. 4,665,510, "Method for Attenuating Multiples in CDP Data Gathers", (R.K. Foster, et al.), relates to a method for attenuating multiples in common depth point data whereby common depth point data is received and spike deconvolution may be performed on the data. The data is constant velocity stacked and gap deconvolution is performed. The primary stack velocity is determined and all data having a velocity other than the primary stack velocity is muted. All scans within the constant velocity stack are composited. These composites are arranged in proper order and displayed.

U.S. Pat. No. 4,675,851, "Method for Seismic Exploration", (C.H. Savit, et al.), relates to sweeps of seismic signals consisting of pulse trains having a predetermined number of pulses. In these pulse trains the periods or durations of the pulses are randomized. In addition, the wave shape and relative time displacements of the pulses in different trains provides substantially constant spectral level over a frequency range containing several octaves.

U.S. Pat. No. 4,779,238, "Method for Fast Slant Stack of Seismic Data", (Michael S. Howard), relates to a method for processing seismic data in the x-t domain to derive a slant stack in the p-tau domain. Partial slant stacks are computed over a plurality of small groups of traces which are iteratively merged using linear interpolation into successively larger groups of traces to exhibit the p-tau data characteristics.

SUMMARY OF THE INVENTION

The present invention provides a method for obtaining a complete seismic section in either two dimensions or three dimensions through pre-stack depth migration while requiring only a portion of the computer time previously required. All the shots are separated into several series, such that within each series the receiver locations are repeating. One or more series of shots is selected for migrating. With each series, receivers are selected from each shot such that their locations are repeating. This allows maximum re-use of the travel time tables and results in the best efficiency of the depth migration. The same principal can be applied to three dimensional prestack depth migration to improve its efficiency.

DESCRIPTION OF THE PREFERRED EMBODIMENT

Figure 1:
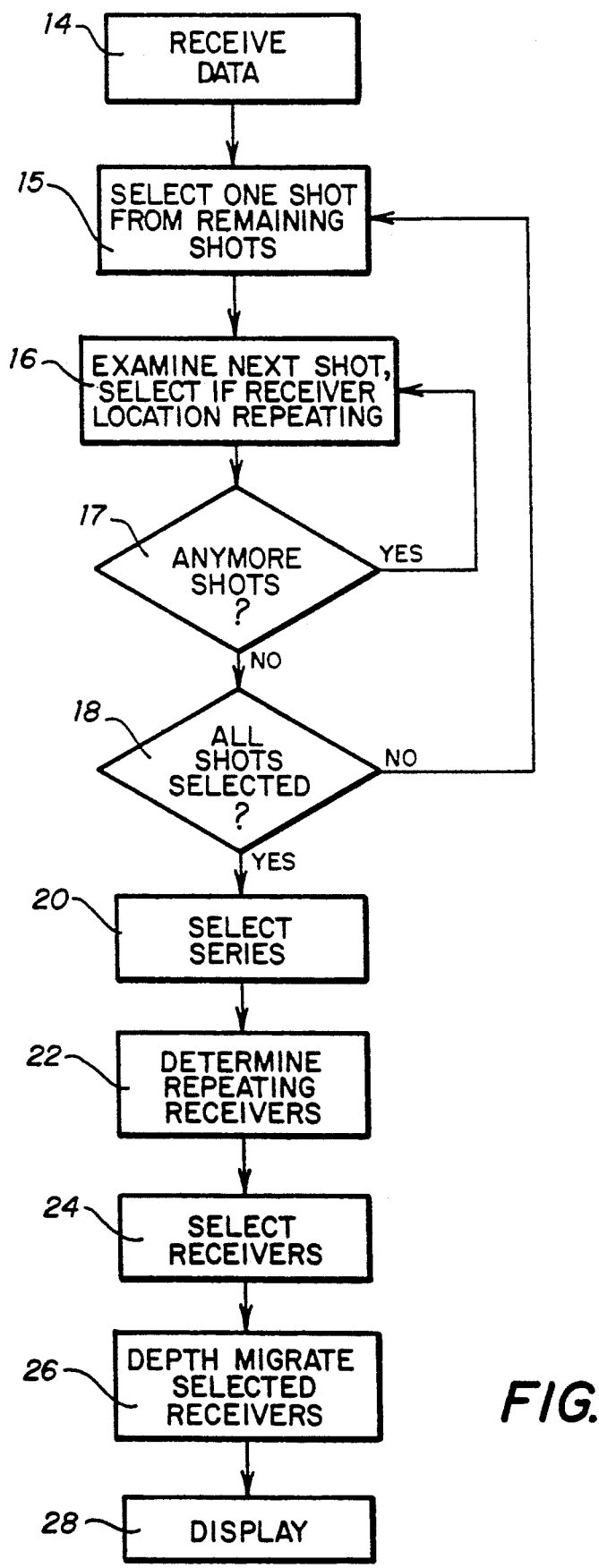
FIG. 1 is a flow chart of the method of the present invention illustrated in block form.

Pre-stack depth migration is an excellent way for imaging complex structures. Its weakness is that a lot of computer time is needed to process the large number of pre-stack seismic traces. This problem is much more severe in three dimensions. There have been several reports lately that five hundred to one thousand hours on a CRAY computer are needed for a single three dimensional pre-stack depth migration.

The method of the present invention outlines a way to select a subset of the input seismic traces so that the computer time needed is much less. It consists basically of two steps that can be implemented in sequence.

The first step is to use only part of the input traces. For example, if two hundred forty offsets are contained in a shot, and sixty are to be used for migration, only the first sixty or every fourth might be used. Since the far offsets are needed for judging the correctness of the interval velocities, the second way (selecting every fourth) is obviously superior to the first.

The second step is to depth migrate the selected traces and to use the time tables to obtain a seismogram of the received data with much reduced processing time.

Referring now to FIG. 1, a block diagram of a flow chart of the present invention is illustrated.

At block 14 seismic data is received. This data may take the form of any unmigrated seismic data such as that currently obtained in the art. The data used may be data received from separate seismic surveys that cover the same surface area. as long as common reference points have been established.

list of the actual shot and receiver locations for the first ten shots:

| shot | shot location | receiver location | | | | | | | | | | |
|---|---|---|---|---|---|---|---|---|---|---|---|---|
| 1 | 0 | 250 | 270 | 290 | 310 | 330 | 350 | 370 | 390 | 410 | 430 | 450 |
| 2 | 20 | 270 | 290 | 310 | 330 | 350 | 370 | 390 | 410 | 430 | 450 | 470 |
| 3 | 40 | 290 | 310 | 330 | 350 | 370 | 390 | 410 | 430 | 450 | 470 | 490 |
| 4 | 60 | 310 | 330 | 350 | 370 | 390 | 410 | 430 | 450 | 470 | 490 | 510 |
| 5 | 80 | 330 | 350 | 370 | 390 | 410 | 430 | 450 | 470 | 490 | 510 | 530 |
| 6 | 100 | 350 | 370 | 390 | 410 | 430 | 450 | 470 | 490 | 510 | 530 | 550 |
| 7 | 120 | 370 | 390 | 410 | 430 | 450 | 470 | 490 | 510 | 530 | 550 | 570 |
| 8 | 140 | 390 | 410 | 430 | 450 | 470 | 490 | 510 | 530 | 550 | 570 | 590 |
| 9 | 160 | 410 | 430 | 450 | 470 | 490 | 510 | 530 | 550 | 570 | 590 | 610 |
| 10 | 180 | 430 | 450 | 470 | 490 | 510 | 530 | 550 | 570 | 590 | 610 | 630 |

At block 15 the first shot is selected and its receiver location is noted. This shot is the beginning shot of a new series.

At block 16 the receiver locations of the next shot is examined. If all its receiver locations are different it is skipped, otherwise it is selected. (The shots in the series have some receiver locations in common, while shots not in the series have no common receiver location with any shots in the series. See examples provided below.)

At block 17 whether there is another shot not yet examined is determined. If there are more shots, the program returns to block 16. If there are no more shots the program proceeds to block 18 where a determination of whether all shots have been selected is made. If all shots have not been selected, the program returns to block 15 and a new series is started, selecting the first shot from the remaining shots.

For example, selection of the first sixty offsets or every fourth offset as described above can be the initial guidelines. Also as described above, the far offsets are needed for judging the correctness of the interval velocities, selecting every fourth offset is superior to selecting the first sixty.

Routine use of the 4, 8, 12, 16, ..., the fourth offset from every shot gather can reduce the computer time. But this is not the best way. We should select these so that the receiver positions are repeating. Because for every new receiver position we need to compute a new travel time table, whereas for a repeating receiver location the same travel time table can be read from disk and re-used. The present invention describes a method for selecting the input traces. Test of field data indicated that it can reduce the computer time by a factor of two.

At block 20 one or more series of shots are selected. From blocks 22 to 24 the receivers in these series are analyzed and the repeating ones are selected.

At block 22 the repeating receivers are determined to further reduce the required processing time. The repeating receivers are selected at block 24.

For example, assume that data for a seismic line, where the near offset distance is 250 m, offset interval is 20 m is received. Further assume that the first shot point is at 0 m, and the shot interval 20 m. The following is a Selection of the 4th, 8th, 12th receiver from every shot would result in having selected the following receivers:

| shot | receiver location | | |
|---|---|---|---|
| 1 | 310 | 390 | 470 ... |
| 2 | 330 | 410 | 490 ... |
| 3 | 350 | 430 | 510 ... |
| 4 | 370 | 450 | 530 ... |
| 5 | 390 | 470 | 550 ... |
| 6 | 410 | 490 | 570 ... |
| 7 | 430 | 510 | 590 ... |
| 8 | 450 | 530 | 610 ... |
| 9 | 470 | 550 | 630 ... |
| 10 | 490 | 570 | 650 ... |

Thus we would need to generate travel time tables at 310, 330, 350, 370, 390, ..., which requires a significant amount of computer time and storage locations to retain the travel times.

A better way to select receiver locations may be chosen as follows: (For this data all the shots belong in a single series)

| shot | shot location | receiver location | | | |
|---|---|---|---|---|---|
| 1 | 0 | 310 | 390 | 470 | (the 4, 8, 12 th ... ) |
| 2 | 20 | 310 | 390 | 470 | (the 3, 7, 11 th ... ) |
| 3 | 40 | 310 | 390 | 470 | (the 2, 6, 10 th ... ) |
| 4 | 60 | 310 | 390 | 470 | (the 1, 5, 9 th ... ) |
| 5 | 80 | 390 | 470 | 550 | (the 4, 8, 12 th ... ) |
| 6 | 100 | 390 | 470 | 550 | (the 3, 7, 11 th ... ) |
| 7 | 120 | 390 | 470 | 550 | (the 2, 6, 10 th ... ) |
| 8 | 140 | 390 | 470 | 550 | (the 1, 5, 9 th ... ) |
| 9 | 160 | 470 | 550 | 630 | (the 4, 8, 12 th ... ) |
| 10 | 180 | 470 | 550 | 630 | (the 3, 7, 11 th ... ) |

This way only travel time tables at 310, 390, 470, 550, ... need to be generated which reduces the total number of travel time tables by a factor of four.

There are other shot and receiver patterns, for example, the shot interval could be thirty and the receiver interval twenty:

| shot | shot location | receiver location | | | | | | | | | | |
|---|---|---|---|---|---|---|---|---|---|---|---|---|
| 1 | 0 | 250 | 270 | 290 | 310 | 330 | 350 | 370 | 390 | 410 | 430 | 450 |
| 2 | 30 | 280 | 300 | 320 | 340 | 360 | 380 | 400 | 420 | 440 | 460 | 480 |
| 3 | 60 | 310 | 330 | 350 | 370 | 390 | 410 | 430 | 450 | 470 | 490 | 510 |
| 4 | 90 | 340 | 360 | 380 | 400 | 420 | 440 | 460 | 480 | 500 | 520 | 540 |
| 5 | 120 | 370 | 390 | 410 | 430 | 450 | 470 | 490 | 510 | 530 | 550 | 570 |
| 6 | 150 | 400 | 420 | 440 | 460 | 480 | 500 | 520 | 540 | 560 | 580 | 600 |
| 7 | 180 | 430 | 450 | 470 | 490 | 510 | 530 | 550 | 570 | 590 | 610 | 630 |
| 8 | 210 | 460 | 480 | 500 | 520 | 540 | 560 | 580 | 600 | 620 | 640 | 660 |

-continued

| shot | shot location | receiver location | | | | | | | | | | |
|---|---|---|---|---|---|---|---|---|---|---|---|---|
| 9 | 240 | 490 | 510 | 530 | 550 | 570 | 590 | 610 | 630 | 650 | 670 | 690 |
| 10 | 270 | 520 | 540 | 560 | 580 | 600 | 620 | 640 | 660 | 680 | 700 | 720 |

This can effectively be treated as two series of shots, the even numbered shots and the odd numbered shots:

| shot | shot location | receiver location | | | | | | | | | | |
|---|---|---|---|---|---|---|---|---|---|---|---|---|
| 1 | 0 | 250 | 270 | 290 | 310 | 330 | 350 | 370 | 390 | 410 | 430 | 450 |
| 3 | 60 | 310 | 330 | 350 | 370 | 390 | 410 | 430 | 450 | 470 | 490 | 510 |
| 5 | 120 | 370 | 390 | 410 | 430 | 450 | 470 | 490 | 510 | 530 | 550 | 570 |
| 7 | 180 | 430 | 450 | 470 | 490 | 510 | 530 | 550 | 570 | 590 | 610 | 630 |
| 9 | 240 | 490 | 510 | 530 | 550 | 570 | 590 | 610 | 630 | 650 | 670 | 690 |
| 2 | 30 | 280 | 300 | 320 | 340 | 360 | 380 | 400 | 420 | 440 | 460 | 480 |
| 4 | 90 | 340 | 360 | 380 | 400 | 420 | 440 | 460 | 480 | 500 | 520 | 540 |
| 6 | 150 | 400 | 420 | 440 | 460 | 480 | 500 | 520 | 540 | 560 | 580 | 600 |
| 8 | 210 | 460 | 480 | 500 | 520 | 540 | 560 | 580 | 600 | 620 | 640 | 660 |
| 10 | 270 | 520 | 540 | 560 | 580 | 600 | 620 | 640 | 660 | 680 | 700 | 720 |

It appears that selection should be made from the series of odd numbered shots as follows:

| shot | shot location | receiver location | | | |
|---|---|---|---|---|---|
| 1 | 0 | 310 | 390 | 470 | (the 4, 8, 12 th . . . ) |
| 3 | 60 | 310 | 390 | 470 | (the 1, 5, 9 th . . . ) |
| 5 | 120 | 390 | 470 | 550 | (the 2, 6, 10 th . . . ) |
| 7 | 180 | 470 | 550 | 630 | (the 3, 7, 11 th . . . ) |
| 9 | 240 | 550 | 630 | 710 | (the 4, 8, 12 th . . . ) |

The selection pattern is the same for the even shots:

| shot | shot location | receiver location | | | |
|---|---|---|---|---|---|
| 2 | 30 | 340 | 420 | 500 | (the 4, 8, 12 th . . . ) |
| 4 | 90 | 340 | 420 | 500 | (the 1, 5, 9 th . . . ) |
| 6 | 150 | 420 | 500 | 580 | (the 2, 6, 10 th . . . ) |
| 8 | 210 | 500 | 580 | 660 | (the 3, 7, 11 th . . . ) |
| 10 | 270 | 580 | 660 | 740 | (the 4, 8, 12 th . . . ) |

Usually, if a third of the traces are selected, the 3rd, 6th, 9th . . . receiver from all the shots would be selected. In such case, travel time tables for 290, 320, 350, 380, . . . (every other receiver) would be needed, even though only a third of the traces are selected. With the new method, the odd shots would be used and the receivers 310, 390, 470 . . . are selected or the even shots would be used and receivers 340, 420, 500, 580, 600 . . . are selected.

At block 26, the selected receiver data is depth migrated.

For the line of the example, the best way is to migrate either the odd shots or the even shots and select as described above, which would result in a very large saving in computer time.

However, the shot locations should also be examined to determine whether any of the locations can be re-used for receivers. This is because travel time table for each shot that is migrated always have to be generated. In the above example, the even shot points can only be re-used for odd receivers, and vice versa. Thus if only the odd shots or the even shots are used, the shot tables can not be re-used. Thus, there is no need to store them.

A simple computer program can be written to compute the percentage of travel time tables that can be re-used for different selection method. It will point to the most efficient selection quickly.

Finally, at block 28, the depth migrated portions of the data which has been selected can be displayed.

To summarize the method of the present invention, all the shots are separated into several series, such that within each series the receiver locations are repeating. One or more series of shots are selected for migrating. With each series, receivers are selected from each shot such that their locations are repeating. This allows maximum re-use of the travel time tables and results in the best efficiency of the depth migration.

The same principal can be applied to three dimensional prestack depth migration to improve its efficiency.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What I claim is:

1. A method for obtaining a complete seismic section in either two dimensions or three dimensions through pre-stack depth migration comprising the steps of:
   receiving unmigrated seismic data having shot locations and corresponding receiver locations for each said shot location;
   separating all said shot locations into shot series having identified corresponding receiver locations that repeat in each said shot series;
   selecting one said shot series for migrating;
   selecting predetermined identified corresponding receiver locations;
   depth migrating the data for each selected predetermined identified corresponding receiver location;
   interpolating depth migration for unselected data; and
   displaying said depth migrated data with said interpolated unselected data.

2. A method for producing a depth migrated seismogram comprising the steps of:
   receiving seismic data;
   separating said received data into different shots series, each said shot series having a different series of receivers;

selecting said shot series when said shot series contains receiver locations that repeat;
eliminating said shot series when said receivers do not repeat or do not repeat within predetermined guidelines;
determining repeating receivers;
selecting said repeating receivers;
depth migrating data representing said repeating receivers; and
displaying said depth migrated data as a seismogram.

3. The method according to claim 2 wherein said displaying step includes the step of interpolating portions of said seismogram representing said eliminated series.

4. A method for improving the efficiency of pre-stack depth migration comprising the steps of:
receiving unmigrated seismic data;
separating all the shots into several series, such that each said series includes the same identified receiver locations;
selecting one or more series of shots for migrating;
selecting predetermined receiver locations from said same identified receiver locations having repeating locations from each shot within each series whereby a representative remaining portion of the received data is obtained;
depth migrating said representative remaining portion; and
displaying said depth migrated representative remaining portion.

5. An apparatus for obtaining a complete seismic section in either two dimensions or three dimensions through pre-stack depth migration comprising:
means for receiving unmigrated seismic data having shot locations and receiver locations;
means for separating all shot locations into several series, such that each said series includes predetermined receiver locations that are the same;
means for selecting one or more series of shot locations for migrating;
means for selecting receiver locations from said predetermined receiver locations within each series;
migrating means for depth migrating the data for each selected receiver location;
means for interpolating depth migration for unselected data; and
display means for displaying said depth migrated data with said unselected data interpolated.

6. An apparatus for producing a depth migrated seismogram comprising:
means for receiving seismic data;
means for separating said received data into different shot series each said shot series having a different series of receivers;
means for selecting said shot series when said receiver locations repeat;
means for eliminating said shot series when said receivers do not repeat or do not repeat within predetermined guidelines;
means for determining repeating receivers;
means for selecting said repeating receivers;
means for depth migrating data representing said repeating receiver; and
display means for displaying said depth migrated data as a seismogram.

7. The apparatus according to claim 6 wherein said display means includes means for interpolating portions of said seismogram representing said eliminated series.

8. An apparatus for improving the efficiency of pre-stack depth migration comprising:
means for receiving unmigrated seismic data;
means for separating all the shots into several shot series, each said shot series having a predetermined number of receiver locations that repeat;
means for selecting one or more shot series for migrating;
means for selecting receiver locations from said receiver locations that repeat from each shot within each shot series whereby a representative remaining portion of the received data is obtained;
means for depth migrating said representative remaining portion; and
means for displaying said depth migrated representative remaining portion.

* * * * *